US008691098B2

(12) United States Patent  (10) Patent No.: US 8,691,098 B2
Zambianchi et al.                   (45) Date of Patent:     Apr. 8, 2014

(54) POROUS WEB, PARTICULARLY FOR FILTRATION OF BIOLOGICAL FLUIDS

(75) Inventors: Laura Zambianchi, Reggio Emilia (IT); Paolo Verri, Mirandola (IT)

(73) Assignee: Fresenius Hemocare Italia S.R.L., Cavezzo (IT)

( * ) Notice: Subject to any disclaimer, the term of this patent is extended or adjusted under 35 U.S.C. 154(b) by 1083 days.

(21) Appl. No.: 11/792,708

(22) PCT Filed: Dec. 10, 2004

(86) PCT No.: PCT/IT2004/000684
§ 371 (c)(1),
(2), (4) Date: Jun. 11, 2007

(87) PCT Pub. No.: WO2006/061862
PCT Pub. Date: Jun. 15, 2006

(65) Prior Publication Data
US 2008/0073294 A1    Mar. 27, 2008

(51) Int. Cl.
*B01D 37/00* (2006.01)
*B01D 61/00* (2006.01)
*C02F 1/00* (2006.01)

(52) U.S. Cl.
USPC ........... 210/767; 210/459; 210/503; 428/113; 428/304.4

(58) Field of Classification Search
None
See application file for complete search history.

(56) References Cited

U.S. PATENT DOCUMENTS

| 3,538,564 | A  | * | 11/1970 | Skoler et al. | 28/109 |
| 3,573,158 | A  | * | 3/1971  | Pall et al.   | 162/131 |
| 3,578,544 | A  | * | 5/1971  | Throsrud      | 428/113 |
| 4,910,064 | A  | * | 3/1990  | Sabee         | 428/113 |
| 5,229,012 | A  | * | 7/1993  | Pall et al.   | 210/767 |
| 5,366,793 | A  | * | 11/1994 | Fitts et al.  | 428/198 |
| 7,361,272 | B2 | * | 4/2008  | Kameda et al. | 210/500.25 |
| 2004/0102122 | A1 |  | 5/2004 | Boney et al. | |
| 2006/0110599 | A1 | * | 5/2006 | Honma et al. | 428/413 |

FOREIGN PATENT DOCUMENTS

| EP | 0 313 348 | 4/1989 |
| EP | 0 606 646 | 7/1994 |

OTHER PUBLICATIONS

Farer, et al., "Study of Melt-blown Structures Formed by Robotic and Melt-blowing Integrated System", International Nonwovens Journal, vol. 11, No. 4, 2002.
Bresee, "Influence of Processing Conditions on Melt-blown Web Structures: Part 1-DCD", INJ, 2004.

* cited by examiner

*Primary Examiner* — Dirk Bass
(74) *Attorney, Agent, or Firm* — Occhiuti & Rohlicek LLP

(57) ABSTRACT

A porous web for filtering fluids has a plurality of adjacent layers of fiber material having anisotropic properties. The anisotropic directions of a given vectorial property of at least two adjacent layers differ one from the other by an angle greater than 0°, and preferably of at least 8°. The porous web is particularly useful as a filter element for the filtration of biological fluids, such as blood and blood components.

21 Claims, 2 Drawing Sheets

POROUS WEB, PARTICULARLY FOR FILTRATION OF BIOLOGICAL FLUIDS

CROSS-REFERENCE TO RELATED APPLICATION

This is a national stage of PCT/IT04/000684 filed Dec. 10, 2004 and published in English.

BACKGROUND OF THE INVENTION

1. Field of Invention

The present invention relates to a porous web, useful as a filter element and to a filter device comprising said porous web, particularly for filtration of biological fluids.

A specific embodiment of the invention relates to filter devices for filtration of blood and blood components, although the invention is not intended to be limited to such a specific embodiment.

2. Description of the Prior Art

Porous elements comprising a plurality of adjacent melt-blown webs or layers are conventionally used for filtration of blood and blood components, particularly for the removal of leukocytes therefrom.

In the melt-blowing process, which has been successfully used in the production of non-woven fabrics since nearly fifty years, a thermoplastic fibre forming polymer is extruded through a linear die containing several hundred small orifices; streams of hot air, exiting from the left and right side of the die, rapidly attenuate the extruded polymer streams to form extremely fine diameter fibres.

The attenuated fibres subsequently get blown by high velocity air on a collector screen, thus forming a fine self-bonded non-woven melt-blown web in a single integrated step. Melt-blown webs, wherein the fibre networks result from the stochastic spatial deposition of fibres, have been generally considered to be constituted by randomly distributed fibres.

Only in recent years, the multi-hole melt-blowing process has been partially understood from a physical point of view, with the help of imaging techniques and powerful mathematical/physical modelling methods, such as for example Computational Fluid Dynamics (CFD).

Actually, the melt-blown webs do have orientation; the orientation depends from material rheology, melt-blowing equipment design (especially from suction, belt and die block design), equipment set-up and greatly from the process conditions, particularly the aerodynamic and thermal conditions.

In the commercial melt-blowing process, there two well-identified directions that are called Machine Direction (MD)—the time forward direction, along the length of the roll in production and Cross Direction (CD)—equivalent to the melt-blowing line width, also called "roll width" or "roll height" direction.

Even if it is difficult to describe a priori web anisotropy given all the variables of the melt-blowing process that might influence the final result, it is relatively easy to get an estimation of web anisotropy once the non-woven web is produced.

A very simple tensile strength test—performed according to one of the international standards (for example the EDANA 20.2-89 standard) on a dynamometer—gives a clear indication of the web orientation by means of two parameters: the breaking load (or breaking strength) of the web and the elongation at maximum load (elongation at break), measured on a given material in both MD and CD. The ratio of MD/CD values of said tensile properties is commonly understood as an indication of fibre orientation.

More recent studies on the microscopic structure of webs confirmed that the MD/CD ratio of a different parameter, the fibre cross-sectional area, is also a useful and more detailed method for describing web anisotropy (cf. "*Influence of Processing Conditions on Melt-Blown Web Structures: part 1—DCD*", by Randall R. Bresee, Department of Materials Science & Engineering, The University of Tennessee, Knoxville, Tennessee and Uzair A. Qureshi, Jentex Corporation, Budford, Ga., INJ, issue Spring 2004).

Even though the breaking load of a given web can be modified by means, for example, of hot calendering (i.e. modifying the intrinsic thickness of the material and the number of fibre-to-fibre contacts), the MD and CD remain clearly distinguishable through different elongation at break.

Also the Fraunhofer Diffraction method has been successfully proposed as a technique to assess the Fibre Orientation Distribution Function (ODF) (cf. "*Study of Melt-blown Structures Formed by Robotic and Melt-blowing Integrated System: Impact of Process Parameters on Fibre Orientation*" by Raoul Farer, et al., College of Textiles, North Caroline State University, Raileigh, USA, INJ, issue Winter 2002).

The anisotropy of the fibres in the web is directly related to the pore structure ("pore shape") of the web. Recent studies also proved that the wetting properties of a non-woven fabric are markedly influenced by web structure anisotropy.

SUMMARY OF THE INVENTION

The present invention exploits the anisotropy properties of a non-woven fibrous web, and particularly of a melt-blown web, to provide a multilayer web useful as a filter element with improved filtration and/or adsorption performance.

Accordingly, a subject of the invention is a porous web for filtering fluids comprising a plurality of adjacent layers of fibre material having anisotropy properties, characterised in that the anisotropic directions of a given vectorial property of at least two adjacent layers differ one from the other by an angle greater than 0° and preferably of at least 8°.

The invention also provides an in-line filtration device comprising one or a plurality of multilayer porous webs as previously defined and a method of using said filter device for the filtration of biological fluids, especially for ex-vivo filtration blood or blood components and more particularly for the removal of leukocytes therefrom.

The subject matter of the invention and additional preferred features of the invention are defined in the appended claims.

BRIEF DESCRIPTION OF THE DRAWINGS

In the annexed drawings.

FIG. 1 is a perspective view of a multilayer porous web in accordance with a first embodiment of the present invention.

FIG. 2 is a perspective view of a multilayer porous web in accordance with a second embodiment of the present invention.

FIG. 3 is a perspective view of a multilayer porous web in accordance with a third embodiment of the present invention.

FIG. 4 is a perspective view of a multilayer porous web in accordance with a fourth embodiment of the present invention.

DETAILED DESCRIPTION OF THE PREFERRED EMBODIMENTS

Figure 1:
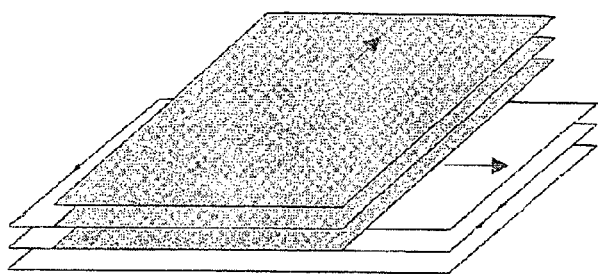
FIGS. 1-4 are schematic views which show the structure of multilayer porous webs according to examples 1-4. It is to be understood that the invention is not to be construed as limited to the embodiments shown in the annexed drawings and examples.
Figure 1:
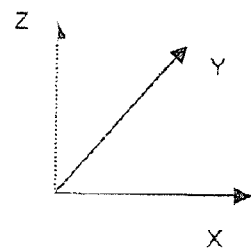
Figure 2:
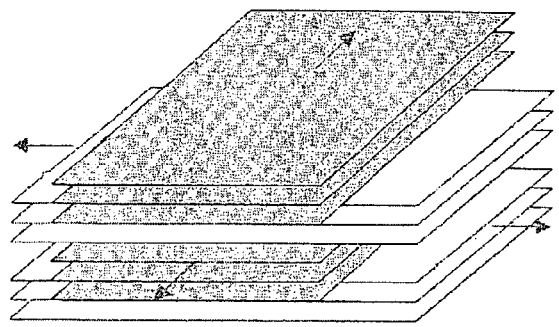
Figure 2:
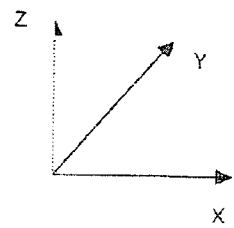

Further scope of applicability of the present invention will become apparent from the detailed description given hereinafter. However, it should be understood that the detailed description and specific examples, while indicating preferred embodiments of the invention, are given by way of illustration only, since various changes and modifications within the, spirit and scope of the invention will become apparent to those skilled in the art from this detailed description.

According to the invention, the non-woven fibrous layers are stacked so that the anisotropic directions of at least two adjacent layers are staggered (not aligned); on account of the possible experimental error in determining the anisotropic direction, the anisotropic direction of the at least two adjacent layers preferably differs of at least 8°.

In this way, a more erratic flow is created between the layers, which increases the overall number of collisions between particles in the fluid and the adsorptive web resulting in a more efficient filtration/adsorption of particles to be removed. This is particularly advantageous in the case of a filter for leukocyte removal, in which the mechanism of adsorption plays an important role in the overall filter performance, since—as it is known—most leukocytes are adsorbed on the surface of the filter web rather than being filtered out because of the size of the cells being greater than the pore size.

The anisotropic direction, to which reference is made, may be the direction lying in the plane of the web, along which the selected vectorial property has a maximum value; the selected vectorial property is preferably a tensile property of the web, most preferably the elongation at break of the web; however, it is understood that other vectorial properties can be selected, such as—as pointed out before—the cross-sectional area of the fibres.

More particularly, the anisotropic direction may be the direction of the vector ODF (Orientation Distribution Function) which can be defined for each layer of a multilayer web, according to the following characteristics.

The vector is lying in the XY plane, which is parallel to the layer surface.

Point of Application:

the geometric centre of the layer in which the vector is lying; it should be understood that the point of application of the vector is actually irrelevant, since the principles underlying the invention are not affected by any translation on the XY plane or onto a parallel plane.

Direction:

the direction of the vector is that along which the selected vectorial property has a maximum value and in the definition of the ODF vector, is preferably the direction of the maximum elongation at break.

Orientation:

the orientation of the vector is irrelevant, since the principles underlying the invention are not affected by rotations of n or multiples thereof.

Length:

the length of the vector can be defined as proportional to the ratio MD/CD of the selected property and preferably of the breaking load.

Melt-blown layers constitute the preferred material for the multilayer web and filter of the invention; they are to be considered as planar webs for which the anisotropic direction can be defined, according to the above-mentioned criteria, both when they are collected onto a conveyor belt or onto a rotating drum. It is however understood that the principles of the invention apply as well to fibrous non-woven webs, which are obtained by techniques other than melt-blowing.

It is understood that the anisotropic direction and/or the ODF vector is to be determined according to the same criteria for each layer; particularly, the tensile strength test to evaluate the elongation at break and breaking load is to be performed in the same conditions (same test set-up) in both MD and CD. For tests performed on webs, it is recommended to follow the procedure of one of the already mentioned international standards, preferably the EDANA 20.2-89 standard.

Necessarily, for tests performed on web samples of smaller size, it is recommended to decrease the distance between the grips and slow down the tests, for example respectively to 30 mm and 20 mm/minute.

Under these conditions, an acceptable experimental error in defining the proper orientation of the ODF vector is ±4°, which corresponds in accepting an experimental error of about ±3.5 mm, if the distance between the grips of the testing apparatus is 100 mm.

With reference to layers extracted from a filter of unknown web orientation, it is recommended to perform the tensile strength tests as if one of the axes of the filter housing would coincide with the MD or CD direction.

With reference to definition of the ODF vector, the principle of the invention can be summarised in that—for at least two layers of a multilayer web—the vector product of their ODF vectors is different from zero, with an acceptable experimental error of ±4° in defining the direction of the vector ODF.

In other words, if we define $\vec{A}_i$ and $\vec{A}_j$ as the ODF vectors of the i-th and j-th layers, lying in the XY plane, $\alpha_{ij}$ the angle between $\vec{A}_i$ and $\vec{A}_j$ and N the total amount of layers to which the invention applies, the scope of the invention covers the following situation:

$$\forall i,j : i,j = 1, \ldots, N$$

$$\forall \alpha_{ij} > 0°, \text{ preferably } \geq 8°$$

$$\exists i,j : |\vec{A}_i \times \vec{A}_j| \neq 0$$

It should however be understood that for practical purposes and specifically in the production of multilayer webs according to the invention, from non-woven or melt-blown webs of which the machine direction is known, it is not necessary to precisely identify the direction along which the selected vectorial property has a maximum value or the precise direction of the ODF vector, as above defined.

Actually, in this case, the anisotropic direction can be arbitrarily selected, according to the same criteria for each layer as corresponding to the CD or MD and the layers constituting the multilayer web can be stacked, so that the MD or CD of at least two adjacent layers are staggered by an angle greater than 0° and preferably greater than 8°.

The materials constituting the layers of the multilayer web are preferably selected among the resins which are better adapted for melt-blowing of fine fibres; such resins include particularly polypropylene, polymethylpentene, nylon 6, polyester PET and most preferably polyester PBT; also included are layers made from multicomponent fibres.

The layers can be made by the same or different materials.

Melt-blown webs are preferred as well as melt-blown webs which have been subjected to further production steps such as hot calendering, laminating, impregnating, coating, etc.

Preferably, the layers to be used in the multilayer webs have identical or similar functions for sieving (physical) filtration. Also included within the scope of the invention is the use of layers having different pore size and/or different CWST.

Typically, the total thickness (depth) of the multilayer web ranges from 1 to 200 mm and the thickness of the single layer may range from 0.1 to 3 mm.

It should be appreciated that the principles underlying the invention can be applied according to several different embodiments.

FIGS. 1-4 show exemplary embodiments, which are described in examples 1-4. The embodiments of the invention include the case where the vectors representing the selected vectorial property or the ODF vector, as above defined, differ only in their direction and have the same magnitude, as well as the case where said vectors differ in their direction and in their magnitude (e.g. up to 50% in their magnitude, that is the case where $\sin \alpha \neq 0$; $|\vec{A}_i| = k|\vec{A}_j|$, where $k \leq 1.5$).

Example 1

FIG. 1

In this example, the multilayer web is comprised of two sets of layers; in one set, all layers are oriented in MD and in the other set, all layers are oriented in CD. Each set may comprise the same number of layers (as shown in the drawing) or a different number of layers. The multilayer web is obtained after having stacked the layers, according to the shown set-up, by means of conventional cutting/punching techniques.

Example 2

FIG. 2

In this example, the multilayer web is comprised of four sets of layers, each including a plurality of layers (namely three layers). In each set, all layers are oriented in the same direction. The layers of the upper set are oriented in MD and the MD direction of each following set is staggered by an angle of 90° with respect to the MD direction of the preceding set.

Example 3

FIG. 3

The set-up of example 3 corresponds to that of example 2, wherein each set of layers is made by only one layer.

With reference to examples 1-3, it is understood that the number of layers constituting each set may vary in a wide range, e.g. from 1 to 50 and the number of sets of layers may also vary in a wide range, e.g. from 2 to 50.

Example 4

FIG. 4

Whereas in all previous examples the anisotropic direction of each set of layers was changed of 90°, in this example the anisotropic direction of each layer is staggered by an angle equal to 360°: m, where m is the total number of layers, with respect to the anisotropic direction of the preceding layer.

Examples 1a-4a

Table 1, which follows, provides data for the filtration performance, measured in terms of filtration time and average white blood cells (WBC) after filtration for four filter devices manufactured according to the principles of the invention (examples 1a-4a).

The filters of examples 1a-4a were manufactured by using identical layers of melt-blown PBT with a basis weight of 50 g/m².

The filter of example 1a consists of thirty-eight layers, which are arranged according to the set up of FIG. 1 which is repeated three times; the filter includes a first set made of three layers and five sets each of seven layers. In each set the layers are oriented according to the same direction. All the odd sets of layers are oriented according to the same direction and all even sets of layers are oriented according to the same direction. The direction of each even set of layers is rotated of 90° with respect to the direction of the preceding odd set. Accordingly, the multilayer web features a total number of five rotations and two positions for the anisotropic direction.

The filter of example 2a also includes a total of thirty-eight layers, which are arranged in alternating sets of three and four layers each, with a total number of twelve sets. The sets are arranged according to the set up of FIG. 2, which is repeated three times; thus, the direction of each even set is rotated of 90°, with respect to the direction of the preceding odd set. Accordingly, there are a number of eleven rotations, with four positions for the anisotropic direction.

Figure 3:
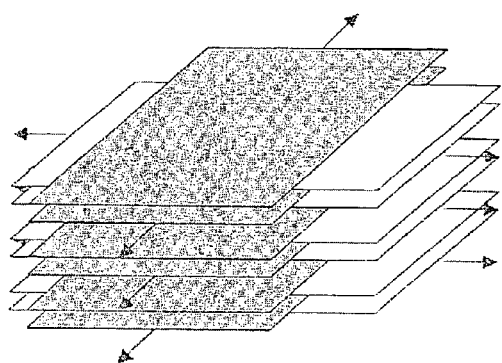
Figure 3:
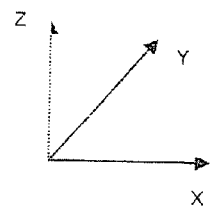

The filter of example 3a consists of thirty-four layers, which are arranged according to the set up of FIG. 3, namely each even layer is rotated of 90° with respect to the preceding odd layer. Accordingly, the filter set up includes thirty-four rotations and four positions for the anisotropic direction.

Figure 4:
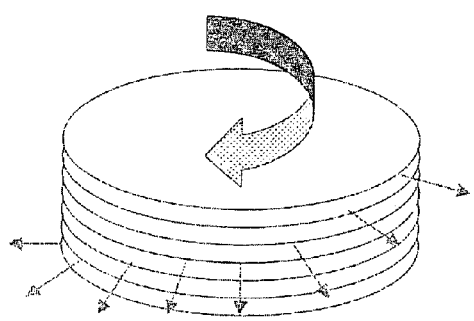
Figure 4:
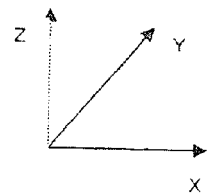

The filter of example 4a consists of thirty-four layers, which are arranged according to the set up shown in FIG. 4. The direction of each layer is rotated of about 9-10° with respect to the direction of the preceding layer.

The anisotropy features of the filters of examples 1a-4a are summarised in table 1, together with the values for the average filtration time and average WBC after filtration, determined under the same filtration conditions.

The filtration performance of the filter of examples 1a and 2a can be readily compared, since both have the same overall number of layers. It can be seen that the filter of example 2a, which has four positions for the anisotropic direction and a total number of eleven rotations, has a longer filtration time and a better performance in leukocyte removal than the filter of example 1a, which has two positions for the anisotropic direction and a total of five rotations.

Also the performance of the filter of example 3a and example 4a can be readily compared, since both have the same number of thirty-four layers and each layer is rotated with respect to the preceding one. The filter of example 4a, in which the layers are rotated gradually, has a longer filtration time and a better leukocyte removal performance than the filter of example 3a in which each layer is rotated by an angle of 90° with respect to the preceding one.

TABLE 1

| Examples | No. of layers | No. of rotations | Anisotropy type | No. Of positions | Avg. filtration time [mm.ss] | Avg. WBC [10 3/unit] |
|---|---|---|---|---|---|---|
| 1a | 38 | 5 | 0°-90° | 2 | 16.21 | 90 |
| 2a | 38 | 11 | 0°-90°-180°-270° | 4 | 19.57 | 60 |
| 3a | 34 | 34 | 0°-90°-180°-270° | 4 | 15.02 | 135 |
| 4a | 34 | 34 | Prev + 9°-10° | 34 | 16.32 | 90 |

The invention also relates to filter devices including one or more filter elements consisting of a multilayer web as described within a filter housing having inlet and outlet ports.

A specific application of the described multilayer web and filter devices relates to the filtration of blood and blood components, such as whole blood, platelet rich plasma, packed red cells, platelet concentrate and plasma.

Such filter devices for the above-mentioned use are wellknown in the art and their structure can be designed according to the known principles, as described e.g. in EP-A-0 313 348. They include disposable filters for use in disposable blood bag systems. Such filter devices may include in addition to filter elements for the removal of leukocytes, additional filter elements having a different function, e.g. for removal of gels.

It will be appreciated that the principles underlying the invention can be applied to any of such filter members, independently from their specific function.

Also claimed is a method for ex-vivo filtration of biological fluids, particularly for leukocyte depletion of blood and of the above-mentioned blood components.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A filter device for filtration of biological fluids, comprising:
   a housing with inlet and outlet ports; and
   a porous web configured to filter leukocytes from said fluids, said porous web including a plurality of adjacent layers of fibre material having anisotropic properties, with an anisotropic direction of a given vectorial property of at least two of said adjacent layers differing one from each other by an angle that is greater than 0° so as to effect said filtration of leukocytes,
   said device being suitable for filtration of biological fluids.

2. The filter device according to claim 1, wherein said anisotropic direction is the direction lying in a plane of the web along which said vectorial property has a maximum value.

3. The filter device according to claim 1, wherein said vectorial property is a tensile property of said layers.

4. The filter device according to claim 1, wherein said vectorial property is an elongation at break.

5. The filter device according to claim 1, wherein said anisotropic direction is the direction of an ODF vector of the layers.

6. The filter device according to claim 1, wherein the anisotropic directions of said at least two layers are staggered by an angle of from 8° to 90°.

7. The filter device according to claim 1, wherein the vectors representing the anisotropic direction of all the layers have a same magnitude.

8. The filter device according to claim 1, wherein the vectors representing the anisotropic direction of said at least two layers differ in their magnitude by up to 50%.

9. The filter device according to claim 1, wherein said layers are melt-blown fibre webs.

10. The filter device according to claim 1, wherein said layers have a material of construction that is a fibre forming material selected from the group consisting of polypropylene, polyethylenterephthalate, and polybuthylenterephthalate.

11. The filter device according to claim 1, wherein the porous web includes a plurality of sets of said layers, each of said sets including a plurality of layers, the layers of each said set being oriented according to the same anisotropic direction and the anisotropic direction of at least two consecutive sets differing one from each other by an angle of at least 8°.

12. The filter device according to claim 11, wherein the porous web includes from 2 to 50 of said sets of layers, and each of said sets includes from 1 to 50 of said layers.

13. The filter device according to claim 11, wherein the anisotropic direction of a given set of layers is staggered from the anisotropic direction of the adjacent set of layers by an angle of 90°.

14. The filter device according to claim 1, wherein said porous web includes a plurality of said layers, and wherein a machine direction of each of said layers is staggered with respect to the machine direction of a preceding layer by an angle of from 8° to 90°.

15. The filter device according to claim 1, wherein said porous web includes m of said layers, m is from 2 to 100, and the anisotropic direction of each of said layers is staggered by an angle equal to 360°: m with respect to the anisotropic direction of a preceding layer.

16. The filter device according to claim 1, wherein said angle is at least 8°.

17. A filter device to filter leukocytes from blood or blood components, comprising:
   a housing with an inlet port to receive said blood or blood components and an outlet port to discharge said filtered blood or blood components; and
   a porous web configured to filter said leukocytes from said blood or blood components, said porous web including a plurality of adjacent layers of fiber material having anisotropic properties, with an anisotropic direction of a vectorial property of at least two of said adjacent layers staggered from each other by an angle of from at least 8° to 90° so as to effect said leukocyte filtration from said blood or blood components,
   said device suitable for filtration of biological fluids.

18. The filter device according to claim 17, wherein said layers of the porous web are constructed of melt-blown fiber.

19. The filter device according to claim 1, wherein said plurality of adjacent layers of fibre material have a total thickness of from 1 to 200 mm.

20. A method for the ex-vivo filtration of leukocytes from blood or blood components, comprising feeding said blood or blood components through a filter device that includes a housing with inlet and outlet ports; and a porous web configured to filter said leukocytes from said blood or blood components, said porous web including a plurality of adjacent layers of fibre material having anisotropic properties, with an anisotropic direction of a given vectorial property of at least two of said adjacent layers differing one from each other by an angle that is greater than 0° so as to effect said filtration of leukocytes, said device being suitable for filtration of biological fluids.

21. The method according to claim 20, wherein said anisotropic directions of said at least two layers are staggered by an angle of from 8° to 90°.

* * * * *